Patented Aug. 20, 1940

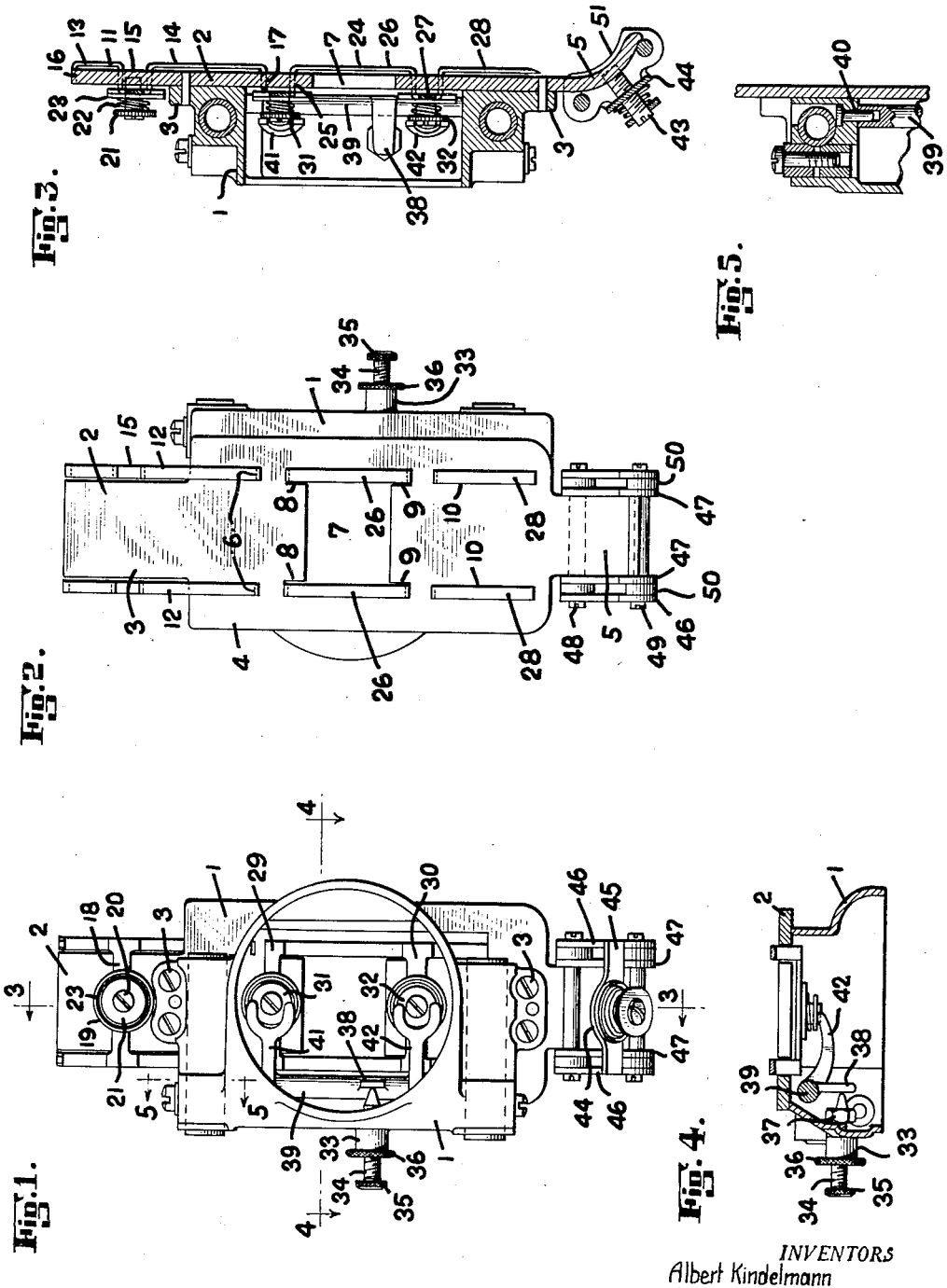

2,211,826

UNITED STATES PATENT OFFICE 2,211,826

FILM GATE

Albert Kindelmann, Floral Park, and Henry F. Heidegger, Brooklyn, N. Y., assignors to International Projector Corporation, New York, N. Y., a corporation of Delaware Application July 15, 1938, Serial No. 219,320

4 Claims. (Cl. 88—17)

This invention relates to an improved film gate assembly and in particular showing a novel and improved guiding means for the film in a motion picture projector.

More specifically the invention constitutes an improvement over the film gate mechanism shown in the patent granted on June 2, 1934 to Louis S. Frappier and Ewald Boecking, No. 1,941,676. In the said patent, upper, middle and lower pressure shoes were shown with an upper spring to support the upper pressure shoe and the upper portion of the middle pressure shoe, and a lower spring to support the lower pressure shoe and the lower portion of the middle pressure shoe. One of the objects of the invention is to improve the said structure in providing entirely separate pressure shoes so that in case a spliced film moves the upper pressure shoe outwardly from the aperture plate, this movement will not be transmitted to the pressure shoe below it until the spliced portion of the film reaches the lower portion, but at that time the upper pressure shoe would have moved back to its normal position so that at least one of the pressure shoes is holding the film in its correct position at all times relative to the aperture plate.

Another object of the invention is to space the pressure shoes apart by a distance at least equal or preferably exceeding the width of the overlapping portion of a spliced film.

Another object of the invention is to provide improved tensioning means so that the various pressure shoes may be separately placed under tension and this tension varied to suit different operative conditions.

Another object of the invention is to support both edges of the film before, during, and after the film passes the exposure aperture, so that all wrinkles will be ironed out and so that the film when passing through the beam of light from the arc lamp will be held flat and free from irregularities. The pressure shoes are, of course, made so that the part thereof contacting the film will be perfectly smooth so as not to scratch or mar the film.

The invention also consists of certain new and original features of construction and combination of parts hereinafter set forth and claimed.

The invention may be better understood by referring to the following description taken in conjunction with the accompanying drawing forming a part thereof in which:

Fig. 1 is an elevational view looking to the rear of our improved film gate mechanism, Fig. 2 is an elevational view looking to the front of the projector in which the mechanism is mounted, Fig. 3 is a cross-sectional view on the line 3—3 of Fig. 1 looking in the direction of the arrows, Fig. 4 is a cross-sectional view on the line 4—4 of Fig. 1 looking in the direction of the arrows, and Fig. 5 is a fragmentary cross-sectional view on the line 5—5 of Fig. 1 looking in the direction of the arrows.

Like reference characters denote like parts in several figures of the drawing.

Referring to the drawing more in detail, the film protector 1 consists of a frame to which the film trap door or gate 2 is secured by means of 10 screws 3'. The film trap door or gate consists of an upwardly extending portion 3, a middle portion 4 which is considerably wider than the portion 3, and a lower portion 5 which is somewhat narrower than the upper portion 3. It is also provided with the holes 6 and an aperture 7 which is in alignment with exposure opening in the aperture plate (not shown) which aperture 7 has upwardly extending grooves 8 and downwardly extending grooves 9, the aperture 7 and grooves 8 and 9 forming virtually a letter H. Below the grooves 9, the middle portion 4 is provided with slots 10. An upper pressure shoe 11 consists of side pressure rails 12 which contact the margins of the film and support the same. These rails 12 consist of an upper and lower film contacting surfaces 13 and 14 and a depressed portion 15 and at the upper and lower ends there are forwardly extending arms 16 and 17, the arms 17 extending within the holes 6. A cross bar 18 connects the two rails 12 at the depressed portion 15 and at the center of this cross bar 18 there is a circular enlargement 19 forming a part thereof. A screw 20 extends through the enlargement 19 and into the gate 2, said screw being provided with screw threads adapted to receive a knurled adjusting disc 21. A spring 22 is interposed between the disc 21 and a cup-shaped disc 23 resting upon the enlargement 19. Since the screw 20 passes through the center of the cross bar 18, the pressure of the spring 18 is equalized between the side rails 12 so that the pressure on each of the side rails would be the same, but one of the side rails might be depressed without depressing the other. If, therefore, there is any irregularity in the two sides of the film, these pressure rails will accommodate the same and will tend to smooth out any irregularities by screwing the knurled disc 21 to the right so that it would shorten the spring, the operator would of course, place increased tension on the side rails of the pressure shoe.

Below the above described pressure shoe is a second pressure shoe 24 which extends above, across, and below the aperture 7. It is provided with rails, each of which is composed of an arm 25, a film contacting portion 26, a depressed portion 27 and a film contacting portion 28. A cross bar 29 connects the two arms 25 of the opposite side rails and a cross bar 30 connects the two depressed portions 27 of the opposite side rails. Each of these cross bars is provided with a spring tensioning means precisely the same as heretofore described with the exception that instead of having the knurled adjusting disc 21, the screws are provided with slidable discs 31 and 32. In order to depress these discs so as to adjust the tension of the springs and thereby regulate the pressure of the pressure shoes, we have provided the following mechanism. The film protector 1 is provided with an internally screw threaded boss 33 which receives an adjusting screw 34 which is rotated by means of a knob 35. The conventional lock nuts 36 and 37 are provided to hold the same in adjusted position, the lock nut 37 providing a means to prevent the screw from being removed. The inner end of the screw bears against an arm 38 attached to a shaft 39 which shaft is mounted on pins 40 in the frame. The shaft 39 is provided with two levers 41 and 42 which are bifurcated at their ends so as to straddle the screws and contact the outer portions of both of of the adjusting discs 31 and 32. By such a construction the pressure shoe adjacent the aperture 7 can be adjusted separately from the upper pressure shoe and vise versa. Furthermore, both of the adjusting mechanisms, that is, the adjusting mechanism for the upper pressure shoe and for the one below it, are complete in themselves and the one is not dependent upon the other. When, therefore, a spliced film, that is, a film of double thickness at the point where it is spliced, is passing the upper pressure shoes and moving them from their normal positions, the lower pressure shoes will be holding the film resiliently at the point of exposure and for a distance above and below the exposure. The distance between the upper and lower pressure shoes is greater than the length of the spliced portion of the film and therefore when the spliced part has left the upper pressure shoes and before it reaches the lower pressure shoes all of the pressure shoes will be holding the film, smoothing out all wrinkles. When the spliced part is passing the pressure shoes 24 the film is being held at the spliced part by the said shoes 24 and the upper pressure shoes are in engagement with the film for the entire length of said shoes while the rails 46 are engaging the film at the lower portion of the gate.

The lower portion 5 of the gate carries a screw 43 which passes through an enlargement 44 of a cross bar 45 which is depressed in precisely the same manner as the cross bar 18. This cross bar 45 is secured to the outer rails 46 of an intermittent film guide consisting of the said outer rails 46 and inner rails 47 which are secured together by means of cross bars 48 and 49. the rails 46 and 47 being spaced by spacers 50. The film contacting surfaces of said rails are substantially arcuate as indicated at 51 in Fig. 3 so as to guide the film at the point when it is passing the intermittent feed mechanism, not shown, it being well understood that the sprocket teeth of the intermittent feed mechanism will engage the sprocket holes of the film with the teeth of the sprocket projecting between the side rails 46 and 47 so that the film is held in close contact with the intermittent sprocket at the point of feed.

It is, therefore, apparent that each of the three film guiding shoes are separately adjustable and the pressure means equalizes the pressure on opposite sides of the film. The upper pressure shoe smooths out irregularities in the film before it reaches the exposure aperture and the film is maintained in a smooth condition before, during, and after exposure. Since the pressure shoes extend almost the entire length of the film gate, any tendency of the film to flutter which might adversely effect the projection of the said film on a screen would be eliminated.

Of course, the pressure on the pressure shoes should not be increased any more than is necessary. In fact, it should be as light as possible to minimize wear, but of course, it must be sufficiently great to iron out all warped conditions of the film and must be sufficiently strong to prevent any tendency of the film to flutter.

Although a specific embodiment of the invention has been shown and described for purposes of illustration, it is to be understood that various omissions, substitutions and changes in the forms and details of the device may be made by those skilled in the art without departing from the spirit of the invention. We, therefore, desire to claim the same broadly except as we may limit ourselves in the following claims.

What is claimed is:

1. As a subcombination of a film gate mechanism, two tracks adapted to contact the opposite margins of a film, two cross bars connecting the two tracks, a spring for each of said cross bars, means to adjust simultaneously the tension of said springs, said means including a plurality of levers, a shaft on which said levers are mounted, an arm carried by said shaft, and an adjusting screw to actuate said arm to rock said shaft and depress said levers to tension said springs.

2. The combination of a frame, a film gate carried thereby, two tracks supported by the film gate, two cross bars connecting the two tracks, a screw projecting laterally from the frame, springs urging said tracks away from the face of the film gate and a bell crank lever operatively interposed between said screw and springs so that when said screw is rotated said springs will be placed under greater or less tension.

3. The combination of a frame, a film gate carried thereby, two tracks supported by the film gate, two cross bars connecting the two tracks, a screw projecting laterally from the frame, springs urging said tracks away from the face of the film gate and a bell crank lever operatively interposed between said screw and springs so that when said screw is rotated said springs will be simultaneously and equally adjusted, said screw contacting an arm of said bell crank lever intermediate said springs.

4. In combination, a plate having a plane surface with a film aperture therein, guide rails carried by said plate and adapted to support the margins of the film, spring means urging said rails away from the plane surface, adjusting means for said spring means, said adjusting means including a laterally extending adjusting screw and a bell crank lever provided with an arm actuated by said screw and two arms to actuate said spring means so that an operator can simultaneously adjust the tension of said springs, said screw actuated arm being positioned intermediate said spring actuating arms.

ALBERT KINDELMANN.
HENRY F. HEIDEGGER.